UNITED STATES PATENT OFFICE 2,149,917

SELECTIVE EXTRACTION OF ROTENONE BY CERTAIN ESTERS

Lowell B. Kilgore, Washington, D. C., assignor to Kilgore Development Corporation, Washington, D. C., a corporation of Virginia No Drawing. Application April 24, 1936, Serial No. 76,293

8 Claims. (Cl. 167—24)

This invention relates to a new composition of matter having valuable insecticidal properties and a means of producing the same. Specifically, I have found that rotenone and other materials having insecticidal properties are extracted from the plants wherein they occur by means of esters belonging to the class of organic chemicals known as $\delta,\epsilon$-unsaturated $\alpha,\gamma$-diketo carboxylic esters of the general formula,

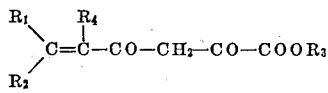

wherein $R_1$ and $R_2$ are the same or different organic radicals or respectively one organic radical and one hydrogen atom, $R_4$ is an alkyl radical or a hydrogen atom, and $R_3$ is any organic radical forming an ester of the carboxyl group.

It has been shown in my copending application, Serial Number 57,457, now Patent No. 2,070,603, granted February 16, 1937, wherein $R_4$ is a hydrogen atom, that the compounds represented by the above generic formula actually exist as a mixture of two isomers, represented as

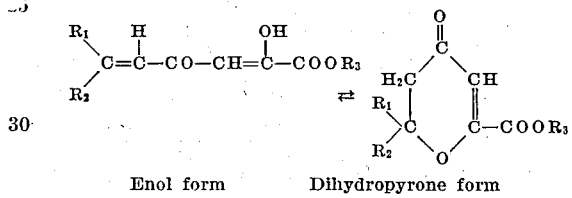

Enol form          Dihydropyrone form

A similar isomerism likewise appears to exist when $R_4$ is an alkyl radical,

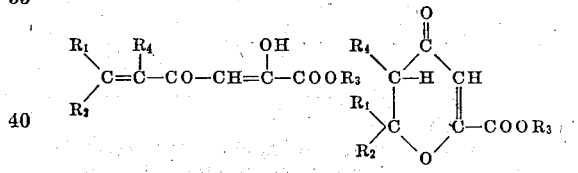

However, the earlier nomenclature whereby compounds of this type are regarded as the keto form,

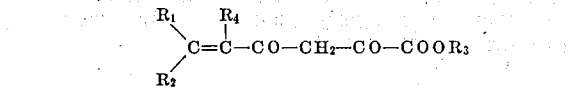

is adhered to in this disclosure of my invention. This nomenclature not only conforms to that used in the better known works of reference, but it is convenient for identifying the compounds used in the process which is the subject of this invention.

As an example of what is meant by the nomenclature just referred to and used herein, I may cite the instance wherein $R_1 = CH_3—$, $R_2 = H$, $R_3 = C_2H_5—$, and $R_4 = CH_3—$, giving according to this nomenclature, ethyl 3-methyl-3-pentene-2-one oxalate,

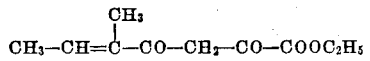

The above keto form written in accordance with the nomenclature used herein probably exists as two isomeric compounds represented by:

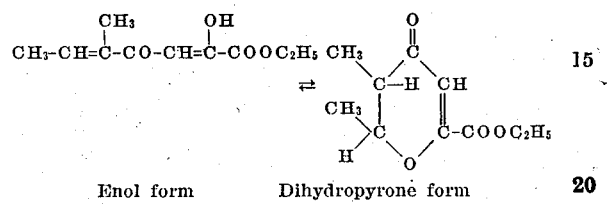

Enol form          Dihydropyrone form

Now, I have discovered that the above organic esters are suitable solvents for the extraction of rotenone and other insecticidal principles such as deguelin, tephrosin and toxicarol, from rotenone bearing plants such as the genera Derris, e. g. *D. elliptica*; Lanchocarpus, e. g. *L. nicou*; and Cracca, e. g. *C. virginianas*. Not only do these esters effectively extract rotenone from such plants but they carry the extracted rotenone into solution in sprayable vehicles such as hydrocarbon solvents, thus effecting a direct transfer of the rotenone from the plant to the final insecticide solution. The following examples will show more clearly what I mean:

Example I

One part of a dry, powdered Derris root containing five per cent rotenone is intimately admixed with four parts by weight of mesityl oxide oxalate, n-butyl ester,

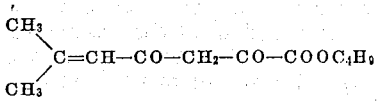

The paste formed by this mixture is then heated at approximately 100° C. for an hour and the solvent removed. The extract so obtained is a red-yellow color and contains aproximately 0.8 per cent rotenone.

These extractions are suitably made between 30 and 200° C. the use of materially higher temperatures causing decomposition of the solvent. It is frequently advisable to make these extractions in an inert atmosphere such as nitrogen or carbon dioxide, especially when a more elevated temperature is used, in order to prevent excessive coloration.

Example II

One part of dry, powdered root of *D. elliptica* containing five per cent of rotenone is mixed with five parts of mesityl oxide oxalate, n-butyl ester. This mixture is then heated to 150° C. for half an hour in an atmosphere of nitrogen. The solvent containing the extracted rotenone is then removed from the mixture.

Example III

One part of dry, powdered root of *D. elliptica* containing five per cent of rotenone is mixed with five parts of mesityl oxide oxalate, n-butyl ester. This mixture is then heated to 150° C. for half an hour in an atmosphere of carbon dioxide. The solvent containing the extracted rotenone is then removed from the mixture.

Example IV

Four parts of powdered root of *D. elliptica* containing five per cent of rotenone are mascerated with five parts by weight of ethyl 3-methyl-3-heptene-2-one oxalate,

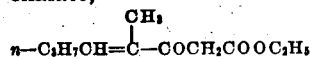

and treated as in Example I. The resulting extract was of a deep straw-yellow color which formed an almost colorless solution in kerosene.

A four per cent solution is then made by diluting one part of the extract with 24 parts by volume of a suitable carrier, as kerosene. This diluted solution now contains in addition to the insecticidal properties of the solvent ester, those of the rotenone, and any other insecticidal substances so extracted from the plants. This solution is a finished insecticide having desirable concomitant physical properties such as absence of undesirable odor, little or no color and good atomization properties.

The following examples are taken from my researches showing the extraction of rotenone from suitable plant materials now used commercially as a source of rotenone, and the consequent production of a new composition having strong insecticidal properties.

The extracts used in the work reported here are made by forming a paste or heavy dispersion of the powdered plant materials, roots, in the ester, wherein ten parts of the root are admixed with 25 parts by weight of the ester. This mixture is then heated at 100° C. for one hour. The extract is removed by filtration, yielding in most cases extracts having straw-yellow to brown-red colors. Four per cent solutions of each of the extracts are then made using a deodorized kerosene solvent suitable for insecticidal tests and filtered whenever necessary. The insecticidal effects of these solutions are then compared to that of similar concentrations of the esters alone by bio-assays using house flies under identical controlled conditions. The results of these tests are shown in Table I.

The bio-assays were made using five day old house flies (*Musca domestica*). The flies were caged in 5 x 5 inch, cylindrical, all-wire cages using approximately 100 flies to the cage. Each cage was separately exposed to the same amount of finely atomized spray or fog from which the larger droplets had been removed. This was accomplished by using an L-shaped pipe, 6 inches in diameter and one foot long on each side of the elbow, mounted with one side of the L in a vertical position. The cage of flies was then suspended in the top of the upright pipe and the atomizer was placed at the other end of the L. Five cubic centimeters of the diluted ester or the extract was then atomized into the pipe at the bottom end producing a highly dispersed, smoke-like fog which was driven evenly throughout the cage containing the flies. The cage of flies so exposed to the atomized insecticide was then removed and set aside for twenty-four hours when the number "dead" was determined. "Dead" here included those flies which were paralyzed and unable to feed after twenty-four hours. This is a common practice in rotenone bio-assays.

In addition to the above bio-assays showing that rotenone is removed from rotenone bearing plants by extraction with the esters which are shown herein, I have used a well-known qualitative chemical method to prove that rotenone was transferred from the plant material to the finished insecticide by this extraction process. For this purpose I employed the colorimetric method of Durham lately improved by Rogers and Calamari (see Ind. and Eng. Chem. Anal. Ed. 8, No. 2, p. 135, (1936)). All the solutions made by diluting the concentrated extracts to make the finished sprays shown in Table I were tested by this method. Strong positive tests for rotenone were obtained in each case showing that rotenone had been extracted from the rotenone bearing roots and had been carried into solution in the finished insecticide.

TABLE I

Biological record using flies showing increase in kill due to insecticidal material extracted from rotenone bearing plants by the esters

| | Esters used as extractants | Per cent "kill" | |
|---|---|---|---|
| | | Pure ester only | Ester and extracted rotenone |
| | *A. Derris root extractions* | | |
| 1 | Mesityl oxide oxalate, ethyl ester | 9 | 100 |
| 2 | Mesityl oxide oxalate, n-butyl ester | 30 | 100 |
| 3 | Mesityl oxide oxalate, iso-butyl ester | 16 | 100 |
| 4 | Mesityl oxide oxalate, sec-amyl ester | 53 | 100 |
| 5 | Mesityl oxide oxalate, cyclohexyl ester | 17 | 100 |
| 6 | Mesityl oxide oxalate, tetrahydrofurfuryl ester | 4 | 85 |
| 7 | Acetalacetone oxalate, n-butyl ester | 80 | 100 |
| 8 | n-Butyralacetone oxalate, ethyl ester | 6 | 95 |
| 9 | 3-methyl-3-pentene-2-one oxalate, ethyl ester | 45 | 85 |
| 10 | 3-methyl-3-heptene-2-one oxalate, ethyl ester | 2 | 100 |
| 11 | Tetrahydroacetophenone oxalate, ethyl ester | 4 | 98 |
| | *B. Cracca virginiana root extraction* | | |
| 12 | Mesityl oxide oxalate, n-butyl ester | 30 | 67 |
| | *C. Cube root extraction* | | |
| 13 | Mesityl oxide oxalate, n-butyl ester | 30 | 62 |

What I claim is:

1. A process which comprises the extraction of rotenone and other compounds having insecticidal properties from rotenone bearing plants by means of an ester belonging to the class of organic compounds knowns as δ,ε-unsaturated-α,γ-diketo carboxylic esters of the general formula,

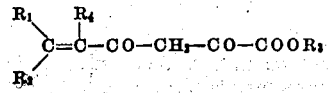

wherein $R_1$ and $R_2$ are the same or different organic radicals or respectively one organic radical and one hydrogen atom, $R_4$ is an alkyl radical or a hydrogen atom and $R_3$ is any organic radical forming an ester of the carboxyl group.

2. A process for extracting rotenone and other compounds having insecticidal properties from rotenone bearing plants by means of an ester selected from the group consisting of: mesityl oxide oxalate, ethyl ester; mesityl oxide oxalate, n-butyl ester; mesityl oxide oxalate, iso-butyl ester; mesityl oxide oxalate, sec-amyl ester; mesityl oxide oxalate, cyclohexyl ester; mesityl oxide oxalate, tetrahydrofurfuryl ester; acetalacetone oxalate, n-butyl ester; n-butyralacetone oxalate, ethyl ester; 3-methyl-3-pentene-2-one oxalate, ethyl ester; 3-methyl-3-heptene-2-one oxalate, ethyl ester; tetrahydroacetophenone oxalate, ethyl ester.

3. A process for extracting rotenone and other compounds having insecticidal properties from rotenone bearing plants by means of a solvent belonging to the class of organic compounds known as $\delta,\epsilon$-unsaturated $\alpha,\gamma$-diketo carboxylic esters of the general formula,

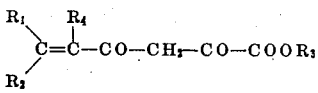

wherein $R_1$ and $R_2$ are the same or different organic radicals or respectively one organic radical and one hydrogen atom, $R_4$ is an alkyl radical or a hydrogen atom, and $R_3$ is any organic radical forming an ester of the carboxyl group, such extraction process being conducted under an inert atmosphere.

4. A process for extracting rotenone and other compounds having insecticidal properties from rotenone bearing plants, such extraction process being conducted under an inert atmosphere, and using as an extractant a solvent selected from the group consisting of: mesityl oxide oxalate, ethyl ester; mesityl oxide oxalate, n-butyl ester; mesityl oxide oxalate, iso-butyl ester; mesityl oxide oxalate, sec-amyl ester; mesityl oxide oxalate, cyclohexyl ester; mesityl oxide oxalate, tetrahydrofurfuryl ester; acetalacetone oxalate, n-butyl ester; n-butyralacetone oxalate, ethyl ester, 3-methyl-3-pentene-2-one oxalate, ethyl ester; 3-methyl-3-heptene-2-one oxalate, ethyl ester; tetrahydroacetophenone oxalate, ethyl ester.

5. An insecticide concentrate soluble in liquid hydrocarbon vehicles comprising rotenone and other insecticidal principles found in rotenone bearing plants, in solution in an ester belonging to the class of organic compounds known as $\delta,\epsilon$-unsaturated $\alpha,\gamma$-diketo carboxylic esters of the general formula,

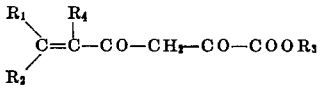

wherein $R_1$ and $R_2$ are the same or different organic radicals or respectively one organic radical and one hydrogen atom, $R_4$ is an alkyl radical or a hydrogen atom, and $R_3$ is any organic radical forming an ester of the carboxyl group.

6. An insecticide concentrate soluble in liquid hydrocarbon vehicles comprising rotenone and other insecticidal principles found in rotenone bearing plants, in solution with an ester selected from the group consisting of: mesityl oxide oxalate, ethyl ester; mesityl oxide oxalate, n-butyl ester; mesityl oxide oxalate, iso-butyl ester; mesityl oxide oxalate, sec-amyl ester; mesityl oxide oxalate, cyclohexyl ester; mesityl oxide oxalate, tetrahydrofurfuryl ester; acetalacetone oxalate, n-butyl ester; n-butyralacetone oxalate, ethyl ester; 3-methyl-3-pentene-2-one oxalate, ethyl ester; 3-methyl-3-heptene-2-one oxalate, ethyl ester; tetrahydroacetophenone oxalate, ethyl ester.

7. An insecticide comprising the insecticidal extractables from rotenone-bearing plants in an ester belonging to the group of organic chemicals known as $\delta,\epsilon$-unsaturated $\alpha,\gamma$-diketo carboxylic esters of the general formula,

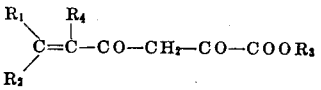

wherein $R_1$ and $R_2$ are the same or different organic radicals or respectively one organic radical and one hydrogen atom, $R_4$ is an alkyl radical or a hydrogen atom, and $R_3$ is any organic radical forming an ester of the carboxyl group, in solution in a liquid hydrocarbon vehicle.

8. An insecticide comprising the insecticidal extractables from rotenone-bearing plants in an ester selected from the group consisting of: mesityl oxide oxalate, ethyl ester; mesityl oxide oxalate, n-butyl ester; mesityl oxide oxalate, iso-butyl ester; mesityl oxide oxalate, sec-amyl ester; mesityl oxide oxalate, cyclohexyl ester; mesityl oxide oxalate, tetrahydrofurfuryl ester; acetalacetone oxalate, n-butyl ester; n-butyralacetone oxalate, ethyl ester; 3-methyl-3-pentene-2-one oxalate, ethyl ester; 3-methyl-3-heptene-2-one oxalate, ethyl ester; tetrahydroacetophenone oxalate, ethyl ester, in solution in a liquid hydrocarbon vehicle.

LOWELL B. KILGORE.